(12) United States Patent
Xie

(10) Patent No.: US 10,739,606 B2
(45) Date of Patent: Aug. 11, 2020

(54) BACK FOCUS ADJUSTMENT MECHANISM AND VIDEO CAMERA PROVIDED WITH SAME

(71) Applicant: Hangzhou Hikvision Digital Technology Co., Ltd., Zhejiang (CN)

(72) Inventor: Qingwei Xie, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 16/098,300

(22) PCT Filed: Aug. 31, 2016

(86) PCT No.: PCT/CN2016/097536
§ 371 (c)(1),
(2) Date: Nov. 1, 2018

(87) PCT Pub. No.: WO2017/193508
PCT Pub. Date: Nov. 16, 2017

(65) Prior Publication Data
US 2019/0162980 A1    May 30, 2019

(30) Foreign Application Priority Data
May 9, 2016   (CN) .......................... 2016 1 0303766

(51) Int. Cl.
*G02B 27/40*   (2006.01)
*H04N 5/225*   (2006.01)
(Continued)

(52) U.S. Cl.
CPC .............. *G02B 27/40* (2013.01); *G02B 7/09* (2013.01); *G03B 3/04* (2013.01); *G03B 3/10* (2013.01);
(Continued)

(58) Field of Classification Search
CPC . G02B 27/40; G02B 7/09; G03B 3/04; G03B 3/10; G03B 13/34; H04N 5/2254;
(Continued)

(56) References Cited

U.S. PATENT DOCUMENTS 5,969,760 A * 10/1999 Ernest ...................... G02B 7/28
348/219.1
6,839,086 B1   1/2005 Katagiri
(Continued)

FOREIGN PATENT DOCUMENTS

| CN | 203084398 | 7/2013 |
|---|---|---|
| CN | 203405656 | 1/2014 |

(Continued)

OTHER PUBLICATIONS 16901463.6; PCT/CN2016/097536; Extended European Search Report dated Apr. 8, 2019.
(Continued)

*Primary Examiner* — Lin Ye
*Assistant Examiner* — Chan T Nguyen
(74) *Attorney, Agent, or Firm* — Meunier Carlin & Curfman LLC

(57) ABSTRACT

Disclosed is a back focus adjustment mechanism and a camera provided with the same. The back focus adjustment mechanism comprises a driving device (10) and a positioning and guiding device (20) separately provided, wherein the positioning and guiding device (20) comprises a positioning assembly (21) and a guiding assembly (22), the guiding
(Continued)

assembly (22) is mounted on the positioning assembly (21), and the driving device (10) is in driving connection with the guiding assembly (22) to drive the guiding assembly (22) to move. In the back focus adjustment mechanism and a camera provided with the same, after the driving device (10) and the positioning and guiding device (20) are separately provided, each structure of the back focus adjustment mechanism can be simpler, and the reliability of each structure of the back focus adjustment mechanism can be increased under the same processing precision.

12 Claims, 3 Drawing Sheets

(51) Int. Cl.
   *G03B 3/10*   (2006.01)
   *G03B 3/04*   (2006.01)
   *G02B 7/09*   (2006.01)
   *G03B 13/34*  (2006.01)

(52) U.S. Cl.
   CPC .......... *G03B 13/34* (2013.01); *H04N 5/2253* (2013.01); *H04N 5/2254* (2013.01)

(58) Field of Classification Search
   CPC .... H04N 5/2253; H04N 5/232; H04N 5/2251; H04N 5/232133; H01J 2237/216
   USPC .......................................... 348/345; 396/133
   See application file for complete search history.

(56) References Cited

U.S. PATENT DOCUMENTS

| | | |
|---|---|---|
| 8,204,371 B2 | 2/2012 | Chen |
| 2005/0104996 A1* | 5/2005 | Makii ............... G02B 7/102 |
| | | 348/360 |
| 2010/0328790 A1 | 12/2010 | Wang |
| 2012/0033956 A1 | 2/2012 | Chen |

FOREIGN PATENT DOCUMENTS

| | | |
|---|---|---|
| CN | 103576279 A | 2/2014 |
| CN | 103592736 | 2/2014 |
| CN | 103676078 | 3/2014 |
| CN | 204069144 | 12/2014 |
| CN | 204334762 | 5/2015 |
| EP | 0895613 A | 9/1997 |
| JP | 2011004139 | 1/2011 |
| JP | 2014215378 | 11/2014 |
| KR | 1020060047926 | 5/2006 |
| KR | 101378586 | 3/2014 |

OTHER PUBLICATIONS

International Search Report (English) and Written Opinion dated Jan. 26, 2017, from International Application No. PCT/CN2016/097536, 10 pages.
First Office Action of corresponding Korean Application No. 10-2018-7034115 dated Dec. 3, 2019, 7 pages.
Notice of Allowance of corresponding Korean Application No. 10-2018-7034115 dated May 22, 2020, 2 pages.

* cited by examiner

BACK FOCUS ADJUSTMENT MECHANISM AND VIDEO CAMERA PROVIDED WITH SAME

The present application claims the priority to a Chinese Patent Application No. 201610303766.6, filed with the China National Intellectual Property Administration on May 9, 2016 and entitled "BACK FOCUS ADJUSTMENT MECHANISM AND VIDEO CAMERA PROVIDED WITH SAME", which is incorporated herein by reference in its entirety.

TECHNICAL FIELD

The present application relates to the technical field of a focal length adjustment device, in particular to a back focus adjustment mechanism and a camera provided with the same.

BACKGROUND

The back focus adjustment mechanism of a camera is configured to adjust the relative position between a lens and an image sensor, so that the distance between the focus of the lens and the image sensor can meet theoretical requirements and thus camera imaging is clear.

The Z axis of the existing back focus adjustment mechanism is positioned by a bolt or screw. The Z axis is a straight line that passes through the focus of the lens and is perpendicular to the imaging plane of the image sensor. The driving and positioning of the existing back focus adjustment mechanism are integrated, which leads to high precision requirements on the parts or a reduced Z-axis coaxial precision of the back focus adjustment mechanism.

SUMMARY

The main objective of the present application is to provide a back focus adjustment mechanism and a camera provided with same, so as to solve the problem of high precision requirements on the parts of the back focus adjustment mechanism in the prior art.

In order to achieve the above objective, according to one aspect of this application, a back focus adjustment mechanism is provided, which includes a driving device and a positioning and guiding device separately provided, wherein the positioning and guiding device includes a positioning assembly and a guiding assembly, the guiding assembly is mounted on the positioning assembly, and the driving device is in driving connection with the guiding assembly to drive the guiding assembly to move.

Further, the positioning assembly includes a mounting plate in which a guiding hole is provided, the guiding assembly includes: a guiding bearing, which is mounted on a first side of the mounting plate and is communicated with the guiding hole; an image sensor fixing plate, which is located on a second side of the mounting plate opposite the first side of the mounting plate; a guiding shaft, which is fixedly provided on the image sensor fixing plate and is provided within the guiding bearing through the guiding hole.

Further, the driving device drives the guiding shaft to move in a direction away from the mounting plate, and the back focus adjustment mechanism further includes a reset mechanism which is configured to reset the guiding shaft.

Further, a plurality of mounting posts are fixedly provided on the image sensor fixing plate, and are provided around a periphery of the guiding shaft, and each mounting post is provided to the first side of the mounting plate passing from the second side of the mounting plate, the reset mechanism includes: an elastic reset member, which is sleeved on the mounting post;

a stop assembly, which is detachably provided at an end of the mounting post away from the mounting plate, wherein two ends of the elastic reset member abut against the stop assembly and the mounting plate respectively.

Further, the stop assembly includes a bolt and a gasket, wherein the elastic reset member is a spring or an elastic rubber cylinder.

Further, the driving device includes: a driving motor; a driving screw, which is rotated under the drive of the driving motor; a driving nut, which is sleeved on the driving screw and drives the guiding shaft to move in a direction away from the mounting plate under the drive of the driving screw.

Further, the back focus adjustment mechanism further includes a limit bracket in which an avoidance hole is provided, the driving screw is provided through the avoidance hole, and the driving nut is located on one side of the limit bracket close to the guiding shaft.

Further, the limit bracket includes two limit plates between which a plurality of support posts are provided, a positioning block is provided on the driving nut, the support posts are provided through the positioning block and the driving nut is located within a space enclosed by the plurality of support posts.

Further, a first one of the two limit plates is provided with the avoidance hole and a second one of the two limit plates is provided with a through hole through which one end of the driving nut passes to be in driving connection with the guiding shaft.

Further, the driving device further includes a reduction gear set, the reduction gear set is in driving connection with the driving motor and the driving screw is in driving connection with the reduction gear set.

Further, a photoelectric switch and a cable are provided on the limit bracket, the photoelectric switch is configured to sense a movement position of the driving nut and the cable is configured to transmit the movement position of the driving nut to a camera control device.

According to another aspect of the present application, a camera is provided including a lens, an image sensor and a back focus adjustment mechanism, the back focus adjustment mechanism being configured to adjust a vertical distance between a focus of the lens and an imaging plane of the image sensor, wherein the back focus adjustment mechanism is a back focus adjustment mechanism described above, the lens is provided on the guiding assembly of the back focus adjustment mechanism, and the image sensor is provided on the positioning assembly of the back focus adjustment mechanism.

By applying the technical solutions of the present application, due to the driving device and the positioning and guiding device in the present application are separately provided, the requirements of assembling parts are greatly reduced during the assembly process, and the driving stability of the driving device to the guiding assembly can be easily guaranteed. That is to say, due to the separate arrangement of the driving device and the positioning and guiding device in the present application, each structure of the back focus adjustment mechanism in the present application can be simplified, and the reliability of each structure of the back focus adjustment mechanism can be increased under the same processing precision.

BRIEF DESCRIPTION OF THE DRAWINGS

The accompanying drawings of the description are used to provide further understanding of the application, and constitute a part of it. Illustrative embodiments of the present application and the descriptions thereof are used to explain the present application and do not constitute improper restrictions on the application. In the drawings.

Figure 1:
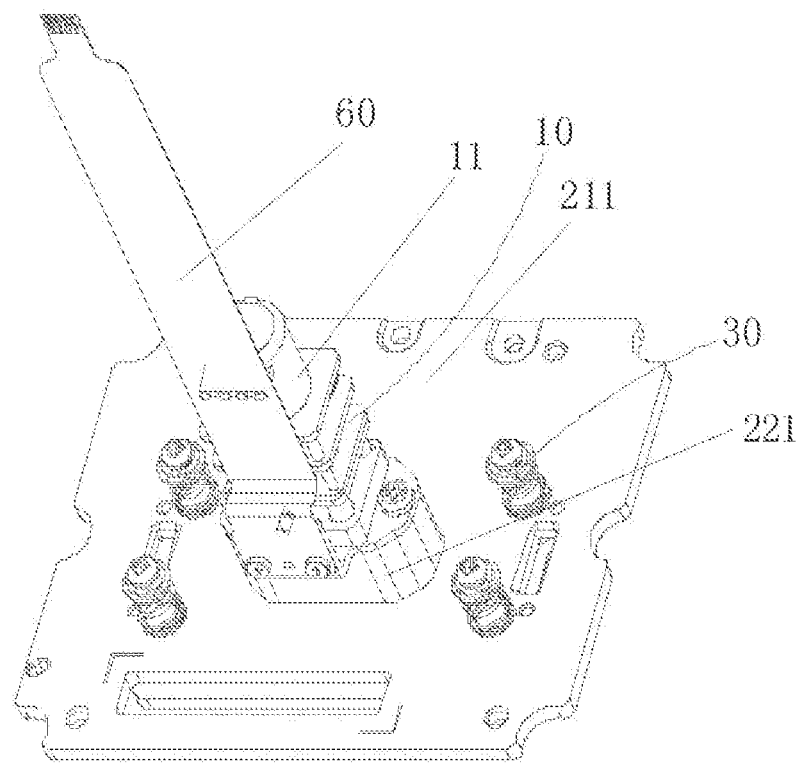
FIG. 1 schematically shows a first 3D structural diagram of a back focus adjustment mechanism of the present application.
Figure 2:
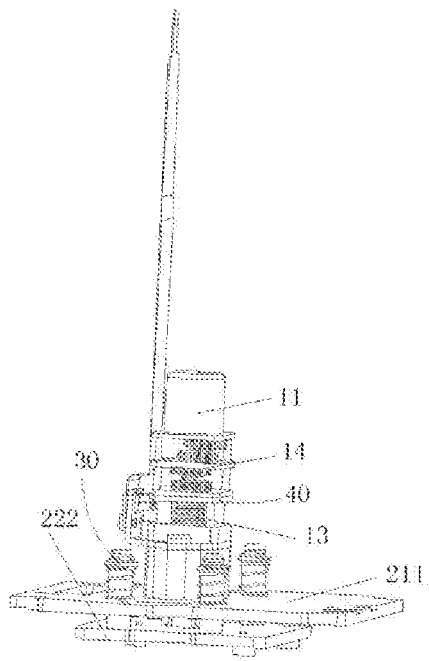
FIG. 2 schematically shows a second 3D structural diagram of the back focus adjustment mechanism of the present application.
Figure 3:
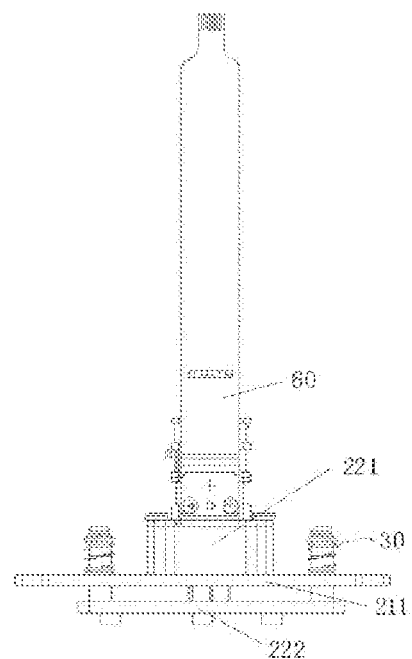
FIG. 3 schematically shows a front view of the back focus adjustment mechanism of the present application.
Figure 4:
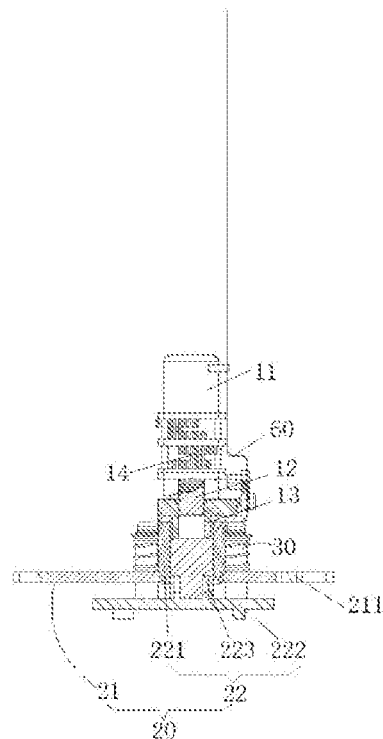
FIG. 4 schematically shows a partial sectional view of the back focus adjustment mechanism of the present application.

The above drawings contain the following reference numbers:

10. driving device; 11. driving motor; 12. driving screw; 13. driving nut; 131. positioning block; 14. reduction gear set; 20. positioning and guiding device; 21. positioning assembly; 211. mounting plate; 2111. guiding hole; 22. guiding assembly; 221. guiding bearing; 222. image sensor fixing plate; 2221. mounting post; 223. guiding shaft; 30. reset mechanism; 31. elastic reset member; 32. stop assembly; 321. bolt; 322. gasket; 40. limit bracket; 41. limit plate; 411. avoidance hole; 412. through hole; 42. support post; 50. photoelectric switch; 60. cable.

DETAILED DESCRIPTION

It should be noted that embodiments in the present application and features in the embodiments can be combined with each other in the absence of conflict. The present application will be described in detail below with reference to the drawings and with embodiments.

It should be noted that the Z axis described herein refers to a straight line passing through the focus of a lens and perpendicular to the imaging plane of an image sensor.

Referring to FIGS. 1 to 5, a back focus adjustment mechanism is provided according to an embodiment of the present application.

The back focus adjustment mechanism in this embodiment includes a driving device 10 and a positioning and guiding device 20 separately provided, wherein the positioning and guiding device 20 includes a positioning assembly 21 and a guiding assembly 22, the guiding assembly 22 is mounted on the positioning assembly 21, and the driving device 10 is in driving connection with the guiding assembly 22 to drive the guiding assembly 22 to move along the Z axis relative to the positioning assembly 21, wherein, the positioning assembly 21 is configured to fix an image sensor of a camera, and the guiding assembly 22 is configured to fix a lens of the camera. When using the back focus adjustment mechanism of this embodiment, the image sensor of the camera can be fixedly mounted on the guiding assembly 22, the lens of the camera can be fixedly mounted on the positioning assembly 21, and then the image sensor mounted on the guiding assembly 22 can be driven to move along the Z axis relative to the lens mounted on the positioning assembly 21 by the driving action of the driving device 10, so as to realize the back focus adjustment of the camera.

Because the driving device 10 and the positioning and guiding device 20 in this embodiment are separately provided, the requirements of assembling parts are greatly reduced during the assembly process, and the driving stability of the driving device 10 to the guiding assembly 22 can be easily guaranteed. That is to say, due to the separate arrangement of the driving device 10 and the positioning and guiding device 20 in the present application, each structure of the back focus adjustment mechanism in this embodiment can be simplified, and the reliability of each structure of the back focus adjustment mechanism can be increased under the same processing precision.

The positioning assembly 21 in this embodiment includes a mounting plate 211 on which a lens is mounted. The guiding assembly 22 includes a guiding bearing 221, an image sensor fixing plate 222, and a guiding shaft 223, wherein an image sensor is mounted on the image sensor fixing plate 222.

In order to mount the guiding assembly 22, a guiding hole 2111 is provided in the guiding plate 211 in this embodiment. When mounting the guiding assembly 22, the guiding bearing 221 is mounted on a first side of the mounting plate 211, and the bearing hole in the guiding bearing 221 is communicated with the guiding hole 2111; then the image sensor fixing plate 222 is mounted on a second side of the mounting plate 211 opposite the first side of the mounting plate 211; and finally the guiding shaft 223 is fixedly provided on the image sensor fixing plate 222 and such that the guiding shaft 223 is provided within the guiding bearing 221 through the guiding hole 2111.

When in use, the image sensor is mounted on the image sensor fixing plate 222, and the lens is mounted on the mounting plate 211, and the guiding shaft 223 is driven by the driving device 10 to move back and forth along the Z axis within the guiding hole 2111, so that the back focus adjustment of the camera is achieved.

In the actual driving process, the driving device 10 drives the guiding shaft 223 to move in a direction away from the mounting plate 211 and then to move closer to the lens. In order to facilitate the movement of the guiding shaft 223 towards the image sensor for reset, the back focus adjustment mechanism in this embodiment includes a reset mechanism 30.

Specifically, the reset mechanism 30 in this embodiment includes an elastic reset member 31 and a stop assembly 32. In order to mount the reset mechanism 30 and ensure the reset stability of the guiding shaft 223, a plurality of mounting posts 2221 are fixedly provided on the image sensor fixing plate 222 in this embodiment. The plurality of mounting posts 2221 are provided around the periphery of the guiding shaft 223, and provided to the first side of the mounting plate 211 passing from the second side of the mounting plate 211.

When mounting the reset mechanism 30, the elastic reset member 31 is sleeved on the mounting post 2221; the stop assembly 32 is detachably provided at the end of the mounting post 2221 away from the mounting plate 211, and the two ends of the elastic reset member 31 abut against the stop assembly 32 and the mounting plate 211 respectively.

In this way, when it is needed to drive the guiding shaft 223 to move in a direction away from the mounting plate 211, it is only needed to initiate the movement of the driving device 10. In this process, the elastic reset member 31 is compressed, and when the driving device 10 moves in a direction toward the image sensor, the guiding shaft 223 moves towards the mounting plate 211 under the action of the elastic force exerted by the elastic reset member 31.

Thus, the reciprocating adjustment of the guiding shaft 223 is completed, which facilitates the back focus adjustment of the camera.

In the assembling process, the guiding shaft 223 and the guiding bearing 221 in this embodiment are in clearance fit with a high precision, which is convenient for driving.

Preferably, in this embodiment, the stop assembly 32 includes a bolt 321 and a gasket 322, wherein the bolt 321 is in threaded connection with the mounting post 2221, the gasket 322 is sleeved on the rod of the bolt 321, and the elastic reset member 31 is sleeved on the mounting post 2221 and pressed between the gasket 322 and the mounting plate 211 under the action of its own elastic force. In other embodiments of the application, the stop assembly 32 can also be provided as a structure such as a stop block or the like.

Preferably, the elastic reset member 31 in this embodiment can be provided as a spring, and can also be provided as a structure such as an elastic rubber cylinder or the like.

Referring again to FIGS. 1 to 5, the driving device 10 in this embodiment includes a driving motor 11, a driving screw 12, and a driving nut 13.

The driving screw 12 is rotated under the drive of the driving motor 11, and the driving nut 13 is screwed on the driving screw 12, and drives the guiding shaft 223 to move in a direction away from the mounting plate 211 under the drive of the driving screw 12. In this way, the circumferential rotation of the driving motor 11 during the operation thereof can be converted into the movement of the driving nut 13 along the length direction of the driving screw 12, and then the guiding shaft 223 can be driven by the driving nut 13 to move.

That is to say, in this embodiment, the coaxial feed of a screw pair formed by the driving screw and the driving nut is separated from the coaxial positioning of the guiding shaft 223, which can lead to a higher adjustment precision under the same processing precision or a reduced processing precision requirement on the parts. As can be seen, the separation of the driving device 10 and the positioning and guiding device 20 enables a simpler structure of the back focus adjustment mechanism in this embodiment and an increased reliability of each structure in the back focus adjustment mechanism under the same processing precision.

In order to control the stroke of the driving nut 13, the back focus adjustment mechanism in this embodiment also includes a limit bracket 40 to limit the rotational freedom of the driving nut 13 relative to the driving screw 12 and the displacement thereof in an axial direction along the driving screw 12. The axial direction of the driving screw 12 described herein coincides with the Z axis. An avoidance hole 411 is provided in the limit bracket 40. When mounted, one end of the driving screw 12 away from the driving motor 11 is passed through the avoidance hole 411, while the driving nut 13 is mounted on one side of the limit bracket 40 close to the guiding shaft 223, thereby limiting the driving nut 13.

Figure 5:
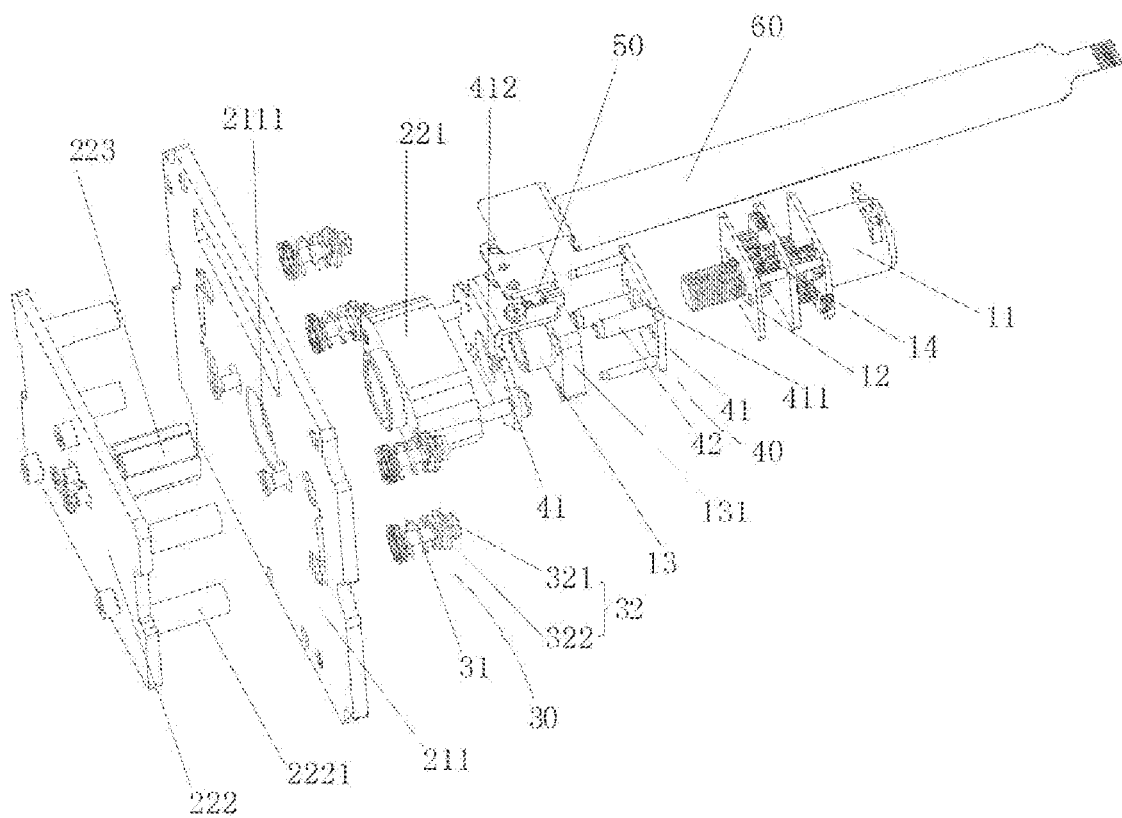
FIG. 5 schematically shows an exploded view of the back focus adjustment mechanism of the present application.

As shown in FIG. 5, the limit bracket 40 in this embodiment includes two limit plates 41 between which a plurality of support posts 42 are provided. The plurality of support posts 42 enclose an installation space, within which the driving nut 13 is located. Thus, the structure is stable and reliable.

A first one of the two limit plates 41 is provided with the above-mentioned avoidance hole 411 through which the driving screw 12 passes, and a second one of the two limit plates 41 is provided with a through hole 412. The second limit plate is fixedly connected to the guiding bearing 221 through a bolt, so that the driving nut 13 is driven by the driving screw 12 to reciprocally move up and down along the support post 42 between the two limit plates 41 and then pushes the image sensor fixing plate 222 to move downward relative to the mounting plate 211 against the elastic force of the elastic reset member 31. In other words, during the operation, an end of the driving nut 13 passes through the through hole 412 to contact the guiding shaft 223 so as to drive the guiding shaft 223 to move. It should be noted that the directional terms "up" and "down" herein are defined based on FIG. 4.

In order to further improve the mounting stability and reliability of the driving nut 13, a positioning block 131 is provided on the driving nut 13 in this embodiment. When mounted, the support posts 42 are passed through the positioning block 131 to locate and guide the driving nut 13.

In order to ensure the stability of the whole back focus adjustment mechanism, the limit plate 41 provided with the through hole 412 and the guiding bearing 221 can be fixedly connected together through a fastening structure such as a screw or the like, and then the guiding bearing 221 can be fixed together with the mounting plate 211 through a screw.

Preferably, the driving device 10 in this embodiment also includes a reduction gear set 14, which is in driving connection with the driving motor 11 and the driving screw 12. By means of the reduction gear set 14, the rotation speed of the driving motor 11 is reduced and the torque is increased so as to drive the guiding assembly 22 to move.

As shown in FIG. 5, a photoelectric switch 50 and a cable 60 are provided on the limit bracket 40 in this embodiment. The movement position of the driving nut 13 can be sensed through the photoelectric switch 50 and transmitted to a camera control device (not shown in the figure) through the cable 60, thereby controlling the driving device 10.

According to another embodiment of the present application, a camera is provided which includes a lens, an image sensor, and a back focus adjustment mechanism. The back focus adjustment mechanism is configured to adjust a vertical distance between the focus of the lens and the imaging plane of the image sensor, and is a back focus adjustment mechanism as mentioned above. The lens is provided on the guiding assembly 22 of the back focus adjustment mechanism, and the image sensor is provided on the positioning assembly 21 of the back focus adjustment mechanism.

From the above description, it can be seen that the above embodiment of the present application achieves the following technical effects.

The application separates the coaxial feed of a screw pair from the coaxial positioning, which leads to a higher adjustment precision under the same processing precision, or a reduced processing precision requirement on the parts. After these functions are separated, the back focus adjustment mechanism is composed of simpler structures, which leads to an enhanced reliability of the structure under the same processing precision.

The foregoing is only preferred embodiments of this application and is not intended to limit this application. Various modifications and variations can be made by those skilled in the art in the present application. Any modifications, alternatives, improvements or the like within the spirit and principle of the present application shall be included within the protection scope of the present application.

The invention claimed is:

1. A back focus adjustment mechanism, comprising a driving device (10) and a positioning and guiding device (20) separately provided, wherein the positioning and guiding device (20) comprises a positioning assembly (21) and a guiding assembly (22), the guiding assembly (22) is mounted on the positioning assembly (21), and the driving device (10) is in driving connection with the guiding assembly (22) to drive the guiding assembly (22) to move;

wherein the guiding assembly (22) further comprises a guiding shaft (223) that is moveable relative to the positioning assembly (21), the driving device (10) and the guiding shaft (223) are provided separately, the driving device (10) can contact the guiding shaft (223) so as to drive the guiding shaft (223) to move in a direction away from the positioning assembly (21).

2. The back focus adjustment mechanism of claim 1, wherein the positioning assembly (21) comprises a mounting plate (211) in which a guiding hole (2111) is provided, the guiding assembly (22) comprises:

a guiding bearing (221), which is mounted on a first side of the mounting plate (211) and is communicated with the guiding hole (2111);

an image sensor fixing plate (222), which is located on a second side of the mounting plate (211) opposite the first side of the mounting plate (211);

wherein the guiding shaft (223) is fixedly provided on the image sensor fixing plate (222) and is provided within the guiding bearing (221) through the guiding hole (2111).

3. The back focus adjustment mechanism of claim 2, wherein the driving device (10) drives the guiding shaft (223) to move in a direction away from the mounting plate (211), and the back focus adjustment mechanism further comprises a reset mechanism (30) which is configured to reset the guiding shaft (223).

4. The back focus adjustment mechanism of claim 3, wherein a plurality of mounting posts (2221) are fixedly provided on the image sensor fixing plate (222), and are provided around a periphery of the guiding shaft (223), and each mounting post (2221) is provided to the first side of the mounting plate (211) passing from the second side of the mounting plate (211), the reset mechanism (30) comprises:

an elastic reset member 31, which is sleeved on the mounting post (2221);

a stop assembly 32, which is detachably provided at an end of the mounting post (2221) away from the mounting plate (211), wherein two ends of the elastic reset member (31) abut against the stop assembly (32) and the mounting plate (211) respectively.

5. The back focus adjustment mechanism of claim 4, wherein the stop assembly (32) comprises a bolt (321) and a gasket (322), wherein the elastic reset member (31) is a spring or an elastic rubber cylinder.

6. The back focus adjustment mechanism of claim 2, wherein the driving device (10) comprises:

a driving motor (11);

a driving screw (12), which is rotated under the drive of the driving motor (11);

a driving nut (13), which is sleeved on the driving screw (12) and drives the guiding shaft (223) to move in a direction away from the mounting plate (211) under the drive of the driving screw (12).

7. The back focus adjustment mechanism of claim 6, wherein the back focus adjustment mechanism further comprises a limit bracket (40) in which an avoidance hole (411) is provided, the driving screw (12) is provided through the avoidance hole (411), and the driving nut (13) is located on one side of the limit bracket (40) close to the guiding shaft (223).

8. The back focus adjustment mechanism of claim 7, wherein the limit bracket (40) comprises two limit plates (41) between which a plurality of support posts (42) are provided, a positioning block (131) is provided on the driving nut (13), the support posts (42) are provided through the positioning block (131) and the driving nut (13) is located within a space enclosed by the support posts (42).

9. The back focus adjustment mechanism of claim 8, wherein a first one of the two limit plates (41) is provided with the avoidance hole (411), and a second one of the two limit plates (41) is provided with a through hole (412) through which one end of the driving nut (13) passes to be in driving connection with the guiding shaft (223).

10. The back focus adjustment mechanism of claim 6, wherein the driving device (10) further comprises a reduction gear set (14), the reduction gear set (14) is in driving connection with the driving motor (11) and the driving screw (12) is in driving connection with the reduction gear set (14).

11. The back focus adjustment mechanism of claim 7, wherein a photoelectric switch (50) and a cable (60) are provided on the limit bracket (40), the photoelectric switch (50) is configured to sense a movement position of the driving nut (13) and the cable (60) is configured to transmit the movement position of the driving nut (13) to a camera control device.

12. A camera comprising a lens, an image sensor and a back focus adjustment mechanism, the back focus adjustment mechanism being configured to adjust a vertical distance between a focus of the lens and an imaging plane of the image sensor, wherein the back focus adjustment mechanism is a back focus adjustment mechanism of claim 1, the lens is provided on the guiding assembly (22) of the back focus adjustment mechanism, and the image sensor is provided on the positioning assembly (21) of the back focus adjustment mechanism.

* * * * *